June 28, 1960   W. M. KOLLENBERGER   2,942,570
DEVICES FOR DAMPING THE ROLLING MOVEMENT OF SHIPS
Filed Oct. 11, 1955   5 Sheets-Sheet 1

Inventor:
Walter M. Kollenberger
By Stevens, Davis, Miller and Mosher
ATTORNEYS

June 28, 1960  W. M. KOLLENBERGER  2,942,570
DEVICES FOR DAMPING THE ROLLING MOVEMENT OF SHIPS
Filed Oct. 11, 1955  5 Sheets-Sheet 3

Inventor:
Walter M. Kollenberger
By Stevens, Davis, Miller & Mosher
ATTORNEYS

June 28, 1960 W. M. KOLLENBERGER 2,942,570
DEVICES FOR DAMPING THE ROLLING MOVEMENT OF SHIPS
Filed Oct. 11, 1955 5 Sheets-Sheet 4

Inventor:
Walter M. Kollenberger
By Stevens, Davis, Miller & Mosher
ATTORNEYS

June 28, 1960  W. M. KOLLENBERGER  2,942,570
DEVICES FOR DAMPING THE ROLLING MOVEMENT OF SHIPS
Filed Oct. 11, 1955  5 Sheets-Sheet 5

INVENTOR.
WALTER MICHAEL KOLLENBERGER
BY
ATTORNEYS

United States Patent Office 2,942,570
Patented June 28, 1960

2,942,570
DEVICES FOR DAMPING THE ROLLING MOVEMENT OF SHIPS

Walter Michael Kollenberger, Rosenhagenstrasse 34, Hamburg-Othmarschen, Germany

Filed Oct. 11, 1955, Ser. No. 539,858

Claims priority, application Germany Oct. 13, 1954

2 Claims. (Cl. 114—126)

This invention relates to stabilizer assemblies for ships' hulls, and more particularly to stabilizer assemblies of the type which are at times rotatable vertically to and from operative positions.

A main object of the invention is to provide a novel and improved stabilizer assembly which is rotatable vertically to and from an operative position with respect to a ship's hull and which is positively guided during such vertical rotation so that the stabilizing surfaces thereof will be held at a constant angle of incidence.

A further object of the invention is to provide novel and improved means to support the stabilizing surfaces of a ship's stabilizer assembly against rotation around a longitudinal axis while said surfaces are being moved to or from an elevated inoperative housed position with respect to the ship's hull.

A still further object of the invention is to provide improved means to lock the stabilizing surfaces of a stabilizer assembly for a ship's hull at a constant angle of incidence while said stabilizing surfaces are in positions other than their operating position, namely, either when said stabilizing surfaces are in a housed elevated position in the ship's hull or are being raised or lowered toward or from said housed elevated position.

Further objects and advantages of the invention will become apparent from the following description and claims and from the accompanying drawings, wherein:

Figure 1:
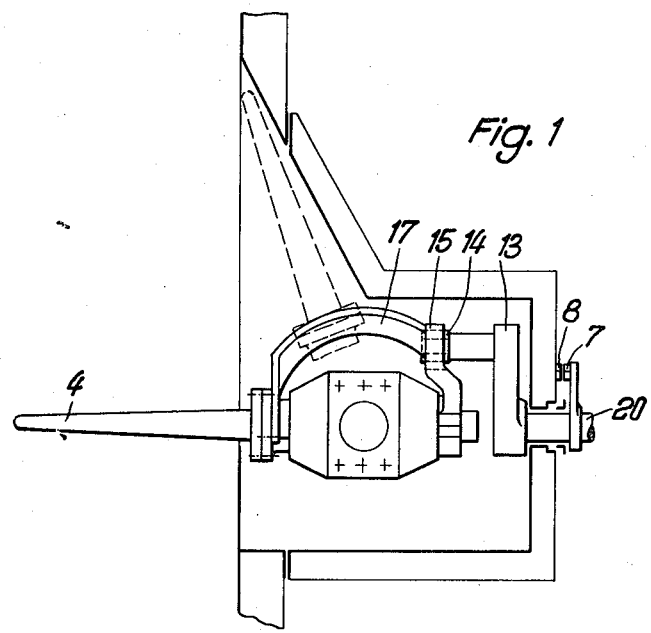
Fig. 1 is a view of a chamber serving to accommodate a stabilizing surface, with a stabilizing surface lowered into operative position, viewed in the longitudinal direction of the ship.
Figure 2:
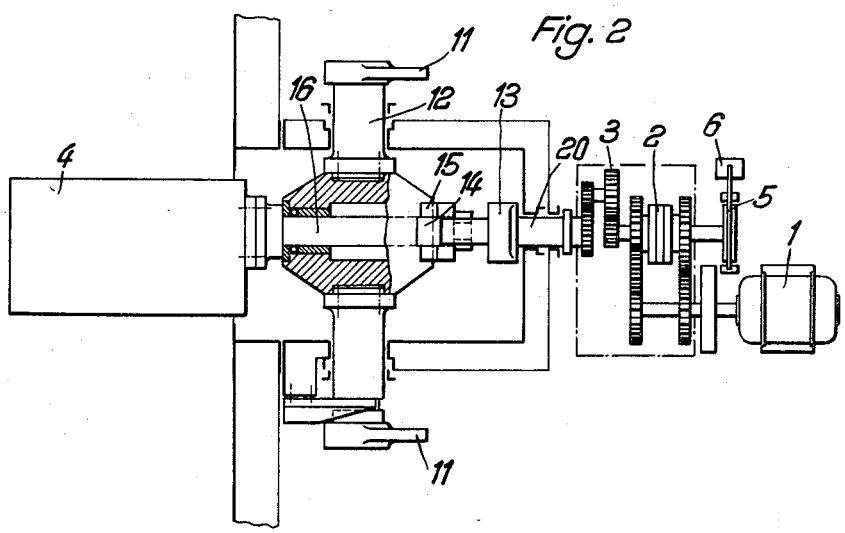
Fig. 2 is a plan view of the complete damping device.
Figure 3:
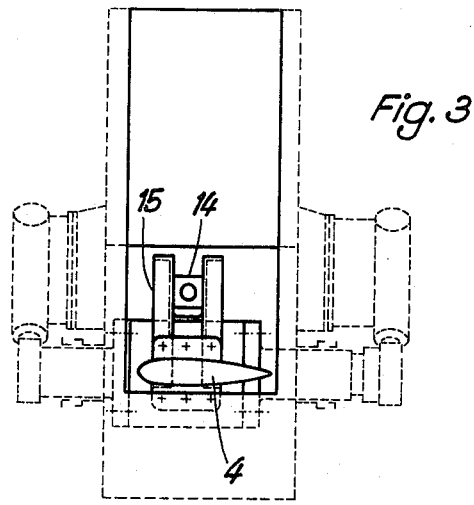
Fig. 3 is a view of the damping device looking towards the ship.
Figure 4:
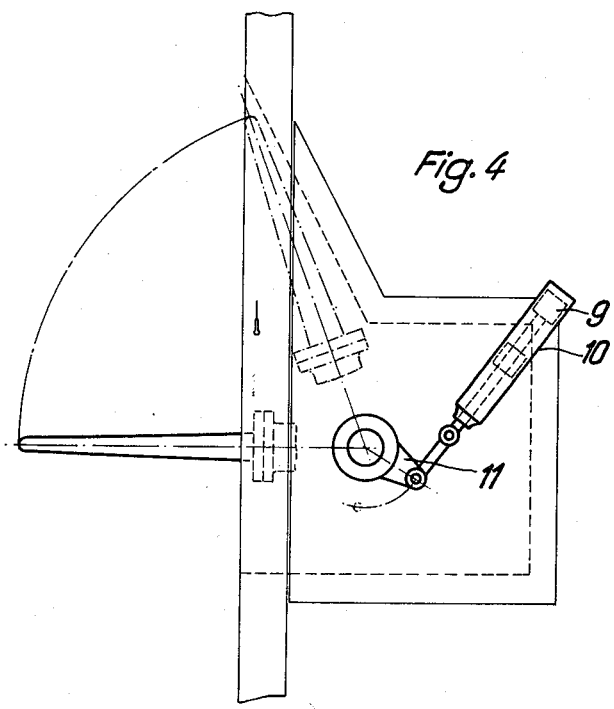
Fig. 4 shows a device for lowering a stabilising surface.
Figure 5:
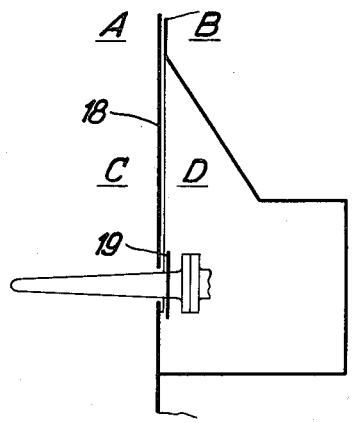
Fig. 5 shows a stabiliser chamber with the stabilizing surface rocked outwards.
Figure 6:
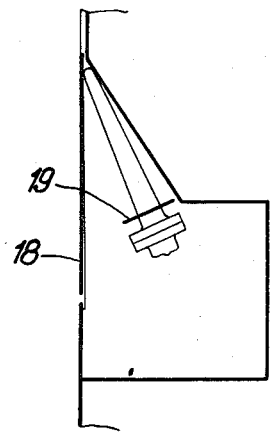
Fig. 6 shows a stabiliser chamber with the stabilising surface rocked inwards.
Figures 7, 8:
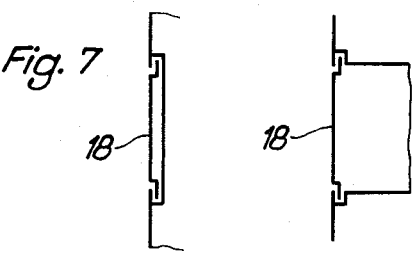
Fig. 7 is a section taken along the line A—B in Fig. 5.
Fig. 8 is a section taken along the line C—D in Fig. 5.

A stabilising surface 4 is adjusted at an angle, which is dependent on the angle of roll of the ship at the time, by means of a continuously running electric motor 1 through the medium of a reversing magneto-coupling 2 and a transmission gear 3. An intermediately disposed brake 5 having a brake-releasing magnet 6 ensures that the stabilising surface 4 is securely held in the corresponding position when the coupling 2 is disconnected.

Upon connection of the magneto-coupling 2 the brake 5 is lifted automatically by the brake-releasing magnet 6 and thus releases the stabilising surface 4 for further angular movement backwards or forwards. Actuation of the stabilising surface takes place by means of a gyroscope, i.e., a so-called anti-roll gyroscope (not shown), viz., in consecutive fashion and in opposite directions, so that the stabilising surface 4 receives alternately a positive and a negative adjustment according to the movement of the ship.

Disconnection of the magneto-coupling 2 occurs as a result of the position of the stabilising surface 4, there being located on the driven shaft 20 of the gear 3 a contact segment 7 having a plurality of contacts, only one of which is made to be effective on each particular occasion, which contact when moving against a fixed cooperating contact 8 interrupts the current to the magneto-coupling 2.

Adjustment of the desired angle of incidence of the stabilising surface also takes place by means of a gyroscope, the same terminating the angular movement of the stabilising surface 4 in accordance with the angle of roll of the ship. To simplify the installation and to avoid the use of a second gyroscope, adjustment of the desired angle of incidence of the stabilising surface may also take place by previous adjustment of the corresponding contacts by hand.

The setting of the stabilising surface 4 by the operating means is effected by a crank 13 connected to the shaft 20 by way of a slide member 14 rotatably secured to the crank 13 and effecting transmission to a forked lever 15 and to the stabiliser shaft 16.

On the forked lever 15 and on the stabiliser shaft 16 there are located two parallel yoke pieces 17, between which there moves the slide member 14 upon the lowering or lifting of the stabilising surface, and which ensure that the stabilising surfaces will be lifted and lowered at a constant angle of incidence, which is preferably approximately 0°.

The lifting and lowering of the stabilising surface 4 takes place with the aid of two plungers 9, which are moved by oil under pressure in cylinders 10 and by way of a lever 11 cause the angular movement of a rocking shaft 12, on which the stabilising surface 4 is mounted by means of its shaft 16. Since the same ends of the two cylinders are connected with each other by means of pipe lines, the same pressure will be exerted on the two plungers, whereby a completely even angular movement of the rocking shaft 12 is ensured.

In the lowered or lifted position of the stabilising surface the oil on both sides of the plunger 9 forms a buffer owing to the closing of the pipe lines, and it thus ensures a perfectly rigid positioning of the rocking shaft 12.

The cylinders 10 are supplied with oil under pressure by an electrically driven oil pump (not shown). The electrical connection of the oil pump motor and of the electric motor 1 is so arranged that the two motors cannot be switched on simultaneously, i.e., the electric motor 1 upon the lowering of the stabilising surface may only be switched on when the stabiliser shaft 16 is in a horizontal position and the oil pump motor has again been switched off. On the other hand when the stabilising surface 4 has been lifted, the latter must again be in a horizontal position with the electric motor 1 disconnected before the oil pump motor can be switched on.

In order to obtain favourable conditions of flow the large aperture in the ship's side necessary for lifting and lowering the stabilising surface is covered not only in the position of rest but also in the operative position of the stabilising surface, by means of a slide member 18, whilst in addition within the stabiliser chamber, preferably in the vicinity of the outer wall, there is secured to the stabilising surface 4 a metal disc 19 for the purpose of covering the chamber opening as completely as possible.

Figure 9:
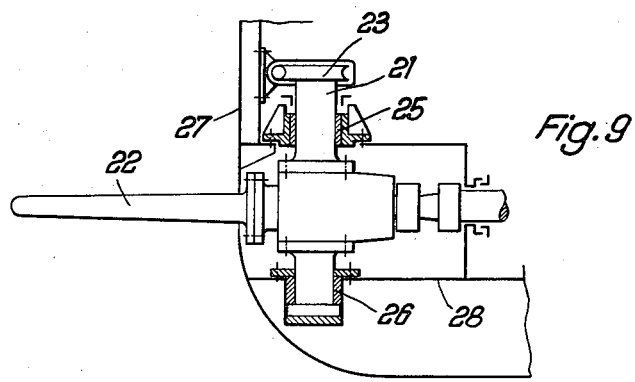
Fig. 9 is a view of a modified embodiment of a rocking device with the stabilising surface in the operative position, viewed in the longitudinal direction of the ship.
Figure 10:
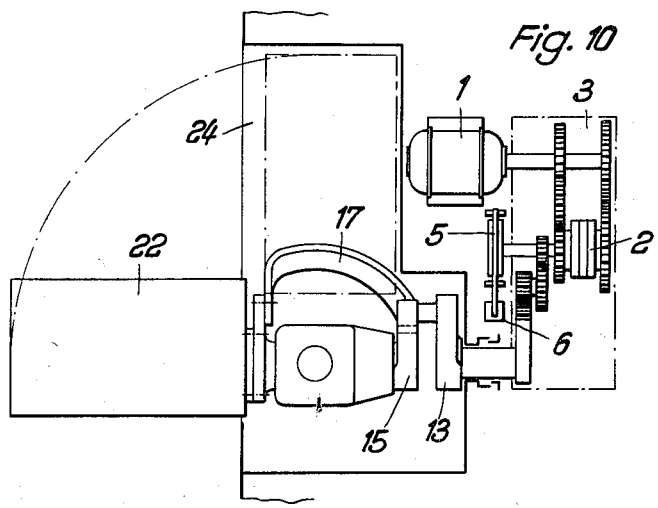
Fig. 10 is a plan view of the damping device according to Fig. 9 with the two positions, i.e., operative position and position of rest, of the stabilising surface.
Figure 11:
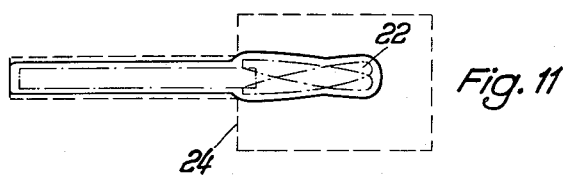
Fig. 11 is a side view of Fig. 9 looking towards the ship.
Figure 12:
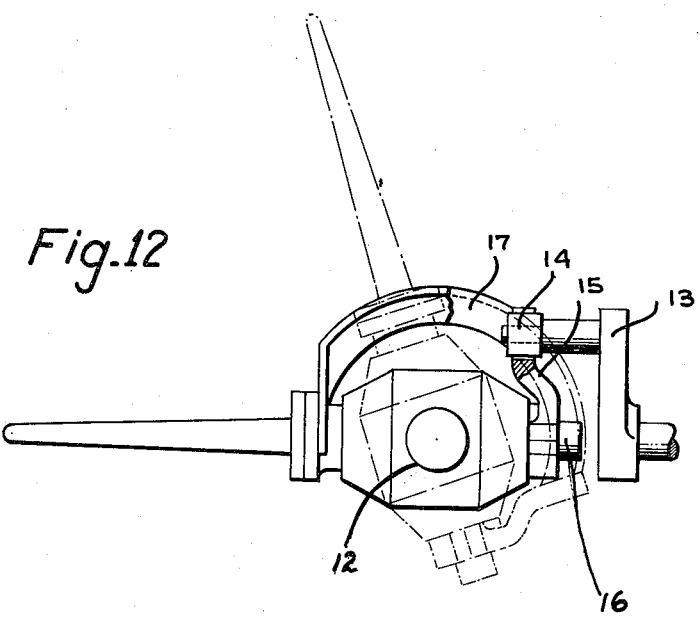
Figure 12 is a side elevational view of the stabilizer assembly of Figure 1, with parts broken away to show details of construction.
Figure 13:
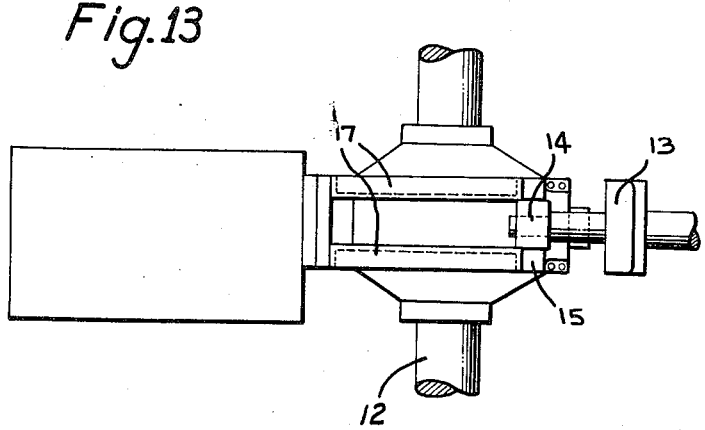
Figure 13 is a top plan view of the structure illustrated in Figure 12.

In the embodiment according to Figs. 9–11 there have been employed so far as the parts of the operating means are concerned the same reference numerals as in the embodiment according to Figs. 1–5.

The stabilising surface 22 mounted to be angularly movable on a rocking shaft 21 is rocked by means of a worm gear 23 by an angle of approximately 90° out of the position of rest within the chamber 24, which is disposed in the longitudinal direction of the ship, into the position of operation, and vice versa, the rocking movement taking place in a horizontal plane. The shaft 21 thereby turns in the bearings 25 and 26, which take over the considerable driving forces acting on the stabilising surfaces 22, whilst the worm gear 23 is loaded only by the comparatively small forces of resistance resulting from the flow of water about the stabilising surface. Owing to the location of the rocking shaft bearings 25, 26 in the vicinity of the ship's side 27 and on the double bottom 28 the forces exerted on the stabilising surface 22 are readily transmitted to the hull of the ship.

Thus, the stabilizing fin of Figures 1 to 4 is moved vertically by a rotating shaft 12 which is rotated by cylinders and levers, while the fin of Figures 9 to 11 is moved vertically by a rotating shaft which is rotated by a worm gear.

The shaft 12 rotates and moves the fin 4 vertically by virtue of the fact that the shaft 16 extends longitudinally through the center housing of the shaft 12. The shaft 16 carries the fin and is rotatably housed in the center housing of the shaft 12 (see Figure 2). The shaft 16 is rotatable about its axis to angularly adjust the fin in the operative position of the stabilizer assembly.

In order to permit such movement, the arcuate guide members 17, 17 are connected to the shaft 16 so as to transmit rotative movements thereto. To rotate the shaft 16, the crank 13 is provided and is drivingly coupled to the guide members 17, 17 by the slide member 14, which is slidably engaged between the guide elements 17, 17. When the crank 13 is rotated, the slide member 14 is rotated and turns the shaft 16. When the shaft 12 is rotated, the guide elements move slidably relative to the intervening slide member 14.

While certain specific embodiments of an improved ship's hull stabilizer assembly have been disclosed in the foregoing description, it will be understood that various modifications within the spirit of the invention may occur to those skilled in the art. Therefore it is intended that no limitations be placed on the invention except as defined by the scope of the appended claims.

I claim:

1. In a stabilizer assembly on a ship hull of the type comprising stabilizing surface members located adjacent the hull, a rotatable stabilizing shaft on the hull supporting said surface members, means to at times selectively rotate said shaft around its axis in either direction of rotation, transverse shaft means rotatably supporting said stabilizing shaft for rotation around a transverse axis, and means to at times rotate said transverse shaft means, whereby to raise and lower said stabilizing surface members; means to insure that the stabilizing surface members will be raised and lowered at a constant angle of incidence comprising two parallel yoke pieces mounted on the stabilizing shaft, and slide means mounted on said first-named shaft-rotating means and slidably engaged between said yoke pieces.

2. In a stabilizer assembly on a ship hull of the type comprising stabilizing surface members located adjacent the hull, a rotatable stabilizing shaft supporting said surface members and rotatably supported on the hull, a forked lever on the shaft, crank means rotatably mounted on the hull and drivingly engaged in said forked lever and being constructed and arranged to at times selectively rotate said shaft around its axis in either direction of rotation, transverse shaft means rotatably mounted on the hull and supporting said shaft for rotation around a transverse axis, and means to at times rotate said transverse shaft means, whereby to raise and lower said stabilizing surface members; means to insure that the stabilizing surface members will be raised and lowered at a constant angle of incidence comprising two parallel yoke pieces mounted on the stabilizing shaft and the forked lever, and a slide member mounted on said crank means and slidably engaged between said yoke pieces.

References Cited in the file of this patent

UNITED STATES PATENTS

| 1,418,335 | Sperry | June 6, 1922 |
| 2,453,957 | Allen | Nov. 16, 1948 |
| 2,530,725 | Pizer | Nov. 21, 1950 |
| 2,595,190 | Edwards | Apr. 29, 1952 |
| 2,616,539 | Wattenberger | Nov. 4, 1952 |

FOREIGN PATENTS

| 162,927 | Great Britain | May 12, 1921 |
| 671,699 | Germany | Feb. 11, 1939 |